United States Patent
Joshi

(10) Patent No.: US 7,653,934 B1
(45) Date of Patent: Jan. 26, 2010

(54) ROLE-BASED ACCESS CONTROL

(75) Inventor: Shaila Joshi, Saratoga, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 944 days.

(21) Appl. No.: 10/892,077

(22) Filed: Jul. 14, 2004

(51) Int. Cl.
 *H04L 29/00* (2006.01)
(52) U.S. Cl. .................. 726/6; 726/4; 726/5; 726/7
(58) Field of Classification Search ............... 726/4–7, 726/28, 29
 See application file for complete search history.

(56) References Cited

U.S. PATENT DOCUMENTS

| | | | | |
|---|---|---|---|---|
| 5,579,478 A | * | 11/1996 | Heiserman et al. ............ | 726/4 |
| 6,574,736 B1 | * | 6/2003 | Andrews .................... | 726/21 |
| 7,093,125 B2 | * | 8/2006 | Robb et al. ................. | 713/166 |
| 2002/0078365 A1 | * | 6/2002 | Burnett et al. .............. | 713/200 |
| 2002/0169956 A1 | * | 11/2002 | Robb et al. ................. | 713/166 |
| 2002/0174333 A1 | * | 11/2002 | Harrah et al. ............... | 713/166 |
| 2005/0198512 A1 | * | 9/2005 | Kline ........................ | 713/182 |

\* cited by examiner

*Primary Examiner*—Kimyen Vu
*Assistant Examiner*—Edward Zee

(57) ABSTRACT

A computer-implemented method for authorizing a user request from a user to perform an action with respect to one of at least one of the plurality of nodes and at least one of the plurality of packages of a cluster is disclosed. The user request is received from a host coupled to communicate with the cluster. The method includes consulting an authorization map to ascertain a role associated with the user. The authorization map is kept in a memory space in one of the plurality of nodes. The method further includes authorizing the user to perform the action if the role associated with the user includes a granted privilege that is higher than a privilege required to perform the user request.

43 Claims, 5 Drawing Sheets

FIG. 1 -- PRIOR ART --

-- PRIOR ART --

| Item | User | Host | Role |
|---|---|---|---|
| 1 | jack | CLUSTER_MEMBER_NODE | Cluster_wide package_admin |
| 2 | root | SysA | Full_admin |
| 3 | jim | CLUSTER_MEMBER_NODE | Per_package_admin for pkgA |
| 4 | jim | SysA | Per_package_admin for PkgA |
| 5 | jim | SysB | Per_package_admin for PkgB |
| 6 | ANY_USER | SysA | monitor |
| 7 | jack | ANY_NODE | monitor |

Fig. 4

ROLE-BASED ACCESS CONTROL

BACKGROUND OF THE INVENTION

Complex server systems require administration to enable a variety of maintenance functions. For examples, different users in a Unix environment may wish to perform a wide variety of administrative actions, ranging from benign actions such as obtaining or reporting on statistical data pertaining to system performance or application program execution to highly sensitive actions such as making critical configuration changes to the system that can affect the service availability, as well as the way in which the hardware or software of the system functions.

In Unix, user access privilege for taking administrative actions generally mirror the Unix file system paradigm. That is Unix provides two categories of users: normal users and root users (also known as super-users). Normal users represent the majority of users and are given very little access privilege in order to prevent these users from taking actions that may be detrimental to system performance and functionality. On the other hand, root users are granted root privileges, which include the ability to perform highly critical operations such as changing the hardware and/or software configuration of the system. There is no middle ground.

In some systems, this all-or-nothing approach to user access privilege control has led to operational and security problems. For example, since normal users are prevented from performing many benign administrative actions such as obtaining statistical data pertaining to application program execution, they must request root users to perform these administrative actions on their behalf. If there are many normal users making these requests, root users may be overwhelmed with mundane administrative tasks. In some systems, the burden on root users and the concomitant bottleneck created by a limited number of root users servicing administrative requests from a much larger group of normal users have led some normal users to surreptitiously employ root access privilege to accomplish their work, sometimes with the tacit approval of some root users.

Furthermore, some root users are not as experienced as others in making critical changes to the system. In some cases, these users are given the root user status simply because they have limited administrative needs that cannot be accommodated by the normal user status. Yet, they have the same privileges under Unix as any other root user and can, once they are given the root user status, make potentially detrimental changes to the system.

To facilitate discussion, consider the Unix cluster arrangement of FIG. 1 in which the prior art user access privilege control paradigm is employed. In FIG. 1, there are shown two nodes: Node1 (102) and Node2 (104). Node1 (102) is shown having a cluster daemon 106, which is employed for interprocess communication between the cluster nodes. As is known, a daemon is a program executing in the background that executes commands when requested. Node2 (104) also has an analogous cluster daemon 108, which is employed to exchange data with cluster daemon 106 to facilitate communication between node1 (102) and node2 (104) and to execute certain operations on the nodes on behalf of the end users, if they have such operation privileges.

A software package A (110), representing an application, is shown executing on node1 (102), while a software package B (112), representing another application, is shown executing on node2 (104).

A plurality of remote systems SYS A, SYS B, and SYS C (122, 124, and 126 respectively) are shown. A plurality of users may be logged into each system, potentially with a given user logged on to multiple systems. These remote systems SYS A, SYS B, and SYS C access node1 (102) and node2 (104) through a hub 130 and a computer network 132. To control access by remote users from SYS A, SYS B, and SYS C to node1 and node2, a cmclnodelist is set up for each of the nodes. Accordingly, a cmclnodelist 140 is stored in a system disk 142 of node1 (102). A cmclnodelist 150 is stored in a system disk 152 of node2 (104).

If a user has an entry in cmclnodelist 140 (such as the entry "SYS A Jim," the entry denotes that that user "Jim", when logged onto SYS A, has access to cluster daemon (106) on node1 (102) to allow Jim to do the operations needed, without having to log on to node1 (102). In the example of FIG. 1, there is also an entry "Node 1 Jim." Accordingly, when user "Jim" logs on to node1 (102), Jim can access cluster daemon 106 to perform operations as needed.

Note that the user access control paradigm of FIG. 1 requires that a cmclnodelist be created for each node of the cluster. Additionally, it is required that the cmclnodelists associated with the multiple nodes of a cluster be identical. This is because if they are not identical, user access may be inadvertently denied. For example, if the entry "node1 root" is not present in cmclnodelist 150, a remote user accessing node1 (102) may not be able to obtain status information from the cluster since the cluster daemon 108 associated with node2 (104) may not allow cluster daemon 106 associated with node1 (102) to obtain such information from node2 (104).

FIG. 2 shows, in a simplified manner, the steps involved in authorizing a user for an administrative action in accordance with the prior art user access control paradigm. Suppose a user employing a console coupled to node1 (102) wishes to halt the execution of the application shown as package A (110). In this case, the user logs into node1 (204) and issues a command to halt the execution of package A (206). In step 208, the system checks to ensure that the user has the authority to perform administrative commands, such as halting the execution of package A (206). This check of step 208 is designed to prevent malicious misuse, accidental error, or unauthorized operation by users who are otherwise listed in cmclnodelist entries. In the prior art, the user can only perform such potentially critical operations (such as the halting of the execution of package A) only if the user had logged in as root.

Note that the request is sent to the cluster daemon (such as cluster daemon 106) since cluster daemon 106 may need to send the request out onto the cluster to ascertain where package A is currently executed before package A can be halted. In the example of FIG. 1, package A happens to be executed on node1 (102). However, suppose node2 ((104) is responsible for coordinating execution of applications in the cluster. In this case, cluster daemon 106 of node1 (102) needs to communicate with cluster daemon 108 of node2 (104) in order to ascertain wherein package A is currently executed before package A can be halted.

If the user is not authorized (according to the check in step 208), the user's request to halt the execution of package A is denied (210). On the other hand, if the user is authorized, the operation is allowed to proceed (212).

With the availability of proxy servers, it has become more common to allow remote access to the cluster via a network. This provides users with greater convenience since users can employ their own personal computers to log into the cluster and to perform activities that traditionally have been available only to users using consoles directly connected to the cluster nodes.

However, as discussed above, remote access carries with it a high degree of security risks. If a remote system (such as a user on SYS A) is granted root privilege to perform certain administrative functions that a normal user is not permitted to do, that remote system now has full administrative privileges to perform potentially detrimental system reconfigurations. If a hacker can steal a password or gain access to the userID of a legitimate user authorized to log in as root, that hacker can, from a remote terminal, perform actions that can cause great harm to the cluster nodes. In this all-or-nothing authorization paradigm, granting administrative privileges to remote systems is highly risky.

Furthermore, it may be desirable at times to grant certain users enhanced privileges beyond those available to prior art non-root users but less than those privileges available to prior art root users. For example, in the prior art, a non-root users cannot perform even certain benign actions if the ability to perform these benign actions are beyond those provided to non-root users. In this situation, the system administrator is forced to either grant these users full root privileges, which increases the risk of such users performing accidental and/or malicious operations, or to deny these users any additional intermediate privileges. There is thus no middle ground.

Because of the rigid root/non-root classification of the prior art, users have resorted to unauthorized actions such as surreptitiously sharing or employing root or super-user passwords or access for the sake of convenience. While this approach is unapproved and the majority of these users will employ such access only to conveniently perform the aforementioned benign actions, the potential for accidental and/or malicious actions exist since the system is now open to those users.

The prior art user access control paradigm additionally imposes a heavy administrative burden on system administrators. When a new user is added or removed, the system administrator has to update all the authorization maps on the participating systems to grant/remove specific privileges associated with the user. Similarly, when a new system is added or removed, or moved from one cluster to another cluster, the system administrator has to update all of the authorization maps on the participating systems to reflect the changes.

SUMMARY OF THE INVENTION

The invention relates, in an embodiment, to a computer-implemented method for authorizing a user request from a user to perform an action with respect to one of at least one of the plurality of nodes and at least one of the plurality of packages of a cluster. The user request is received from a host coupled to communicate with the cluster. The method includes consulting an authorization map to ascertain a role associated with the user. The authorization map is kept in a memory space in one of the plurality of nodes. The method further includes authorizing the user to perform the action if the role associated with the user includes a granted privilege that is higher than a privilege required to perform the user request.

In another embodiment, the invention relates to an article of manufacture comprising a program storage medium having computer readable code embodied therein. The computer readable code being configured to authorize a user request from a user of a computer cluster having a plurality of nodes configured for executing a plurality of software packages. The user request involves a request to perform an action with respect to one of at least one of the plurality of nodes and at least one of the plurality of packages. There is included computer readable code for consulting an authorization map to ascertain a role associated with the user, the authorization map being kept in a memory space in one of the plurality of nodes. There is further included computer readable code for authorizing the user to perform the action if the role associated with the user includes a granted privilege that is higher than a privilege required to perform the user request.

In yet another embodiment, the invention relates to a computer cluster having a plurality of nodes configured for executing a plurality of software packages. The computer has an arrangement for authorizing a user request from a user to perform an action with respect to one of at least one of the plurality of nodes and at least one of the plurality of packages. The user request is received from a host coupled to communicate with the cluster. There is included an authorization map having data pertaining to roles associated with users, with at least one role of the roles in the authorization map being associated with privileges different from privileges associated with a Unix root user. The privileges associated with the at least one role is also different from privileges associated with a Unix normal user. The authorization map is kept in a memory space in one of the plurality of nodes.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which:

FIG. 4 shows, in accordance with one embodiment of the present invention, a conceptual representation of the authorization map, which is associated with a cluster and replicated on each cluster member node.

DETAILED DESCRIPTION OF THE PREFERRED EMBODIMENTS

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention. The features and advantages of the present invention may be better understood with reference to the drawings and discussions that follow.

In accordance with embodiments of the invention, a plurality of hierarchical roles are provided to provide intermediate privileges. These hierarchical roles span the gap in privileges between the prior art non-root privileges and root privileges. Since they are hierarchical, a role that is higher in privilege will have all the privileges accorded to one that is deemed lower in privilege than itself. Although the number of roles may be unlimited and the various roles may be configured in any manner, there are contemplated three main role categories: monitor, administration, and configuration.

Figure 1:
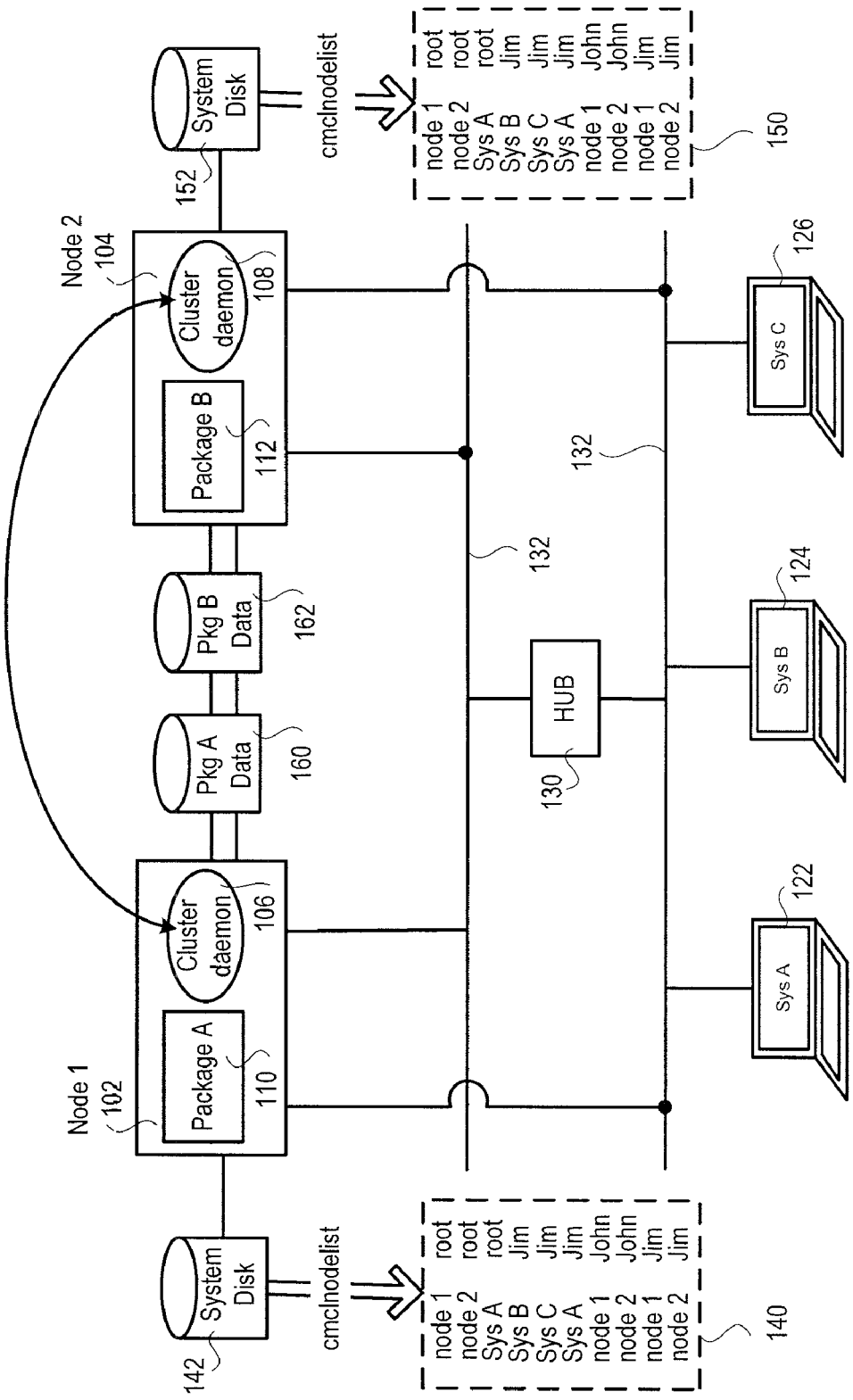
FIG. 1 conceptually illustrates a prior art user access privilege control paradigm.
Figure 2:
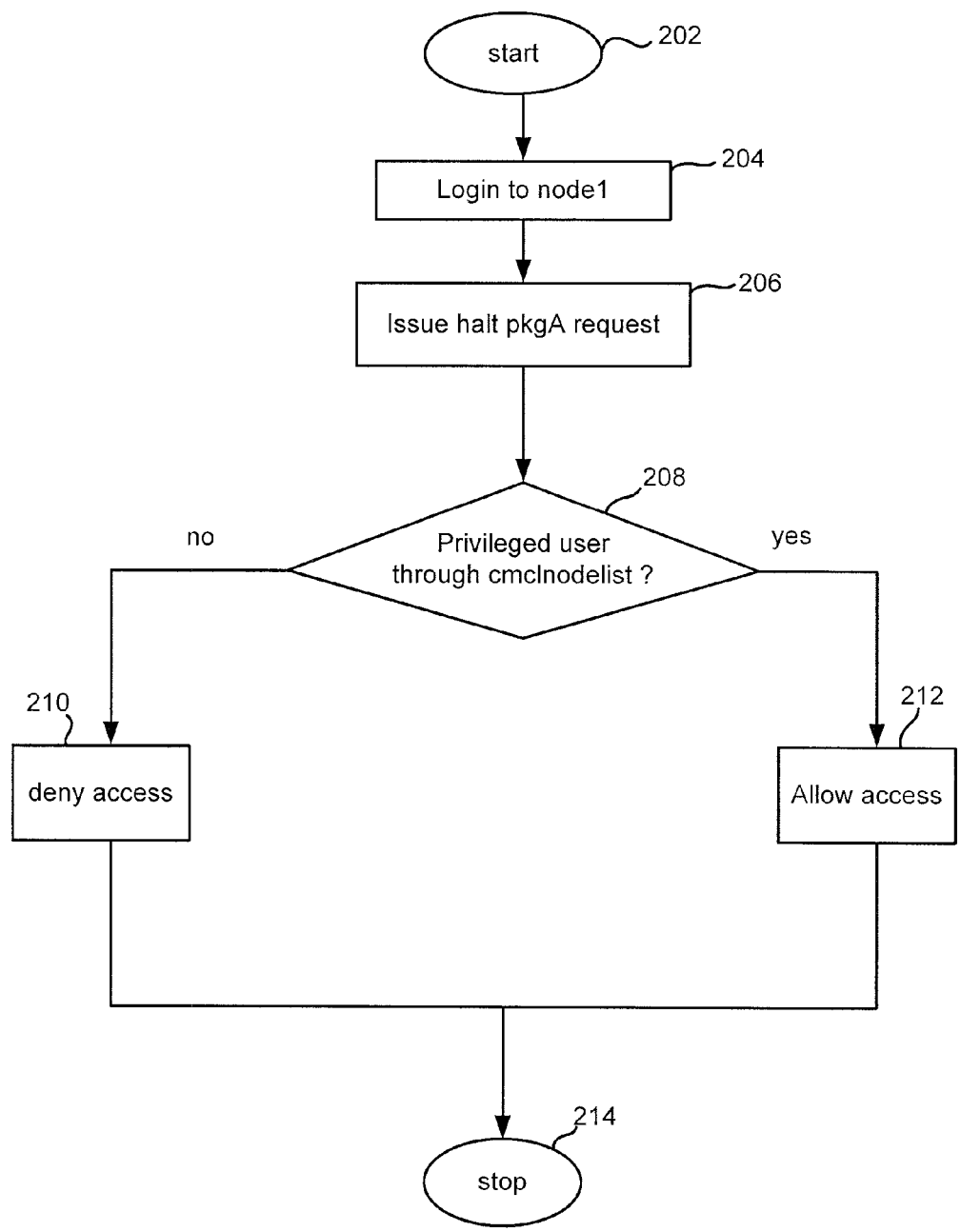
FIG. 2 shows, in a simplified manner, the steps involved in authorizing a user for an administrative action in accordance with the prior art user access control paradigm.
Figure 3:
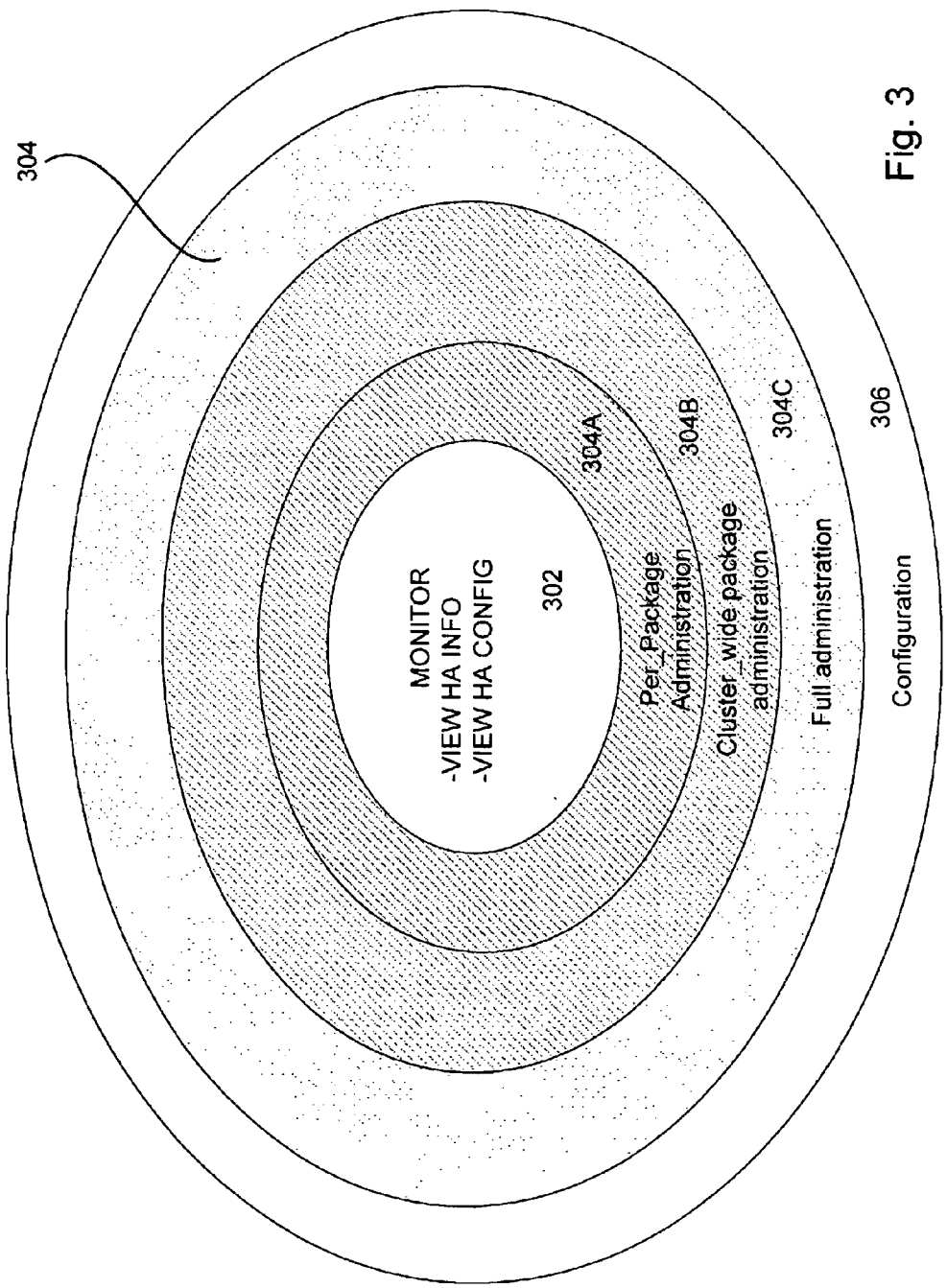
FIG. 3 conceptually illustrates these roles in accordance with an embodiment of the invention.

FIG. 3 conceptually illustrates these roles in accordance with an embodiment of the invention. With reference to FIG. 3, monitoring role category 302 refers to the ability to view certain information such as high availability (HA) information and HA configuration. The monitored information may represent statistical information pertaining to any of the nodes or packages in the cluster. For example, a user having the monitor privilege may be able to obtain information such as whether a node is operational or down, whether a package is executing or halting, etc. A user in monitoring role category 302 may also view HA configuration information such as which package on which node is executing, the execution profile of a package, etc.

Administration role category 304 refers to the ability to perform certain administrative actions. Note that administration role category 304 is higher in privilege than the monitoring role category 302 and thus already includes all the monitoring privileges associated with monitoring role category 302. The administrative actions may include different types of actions pertaining to the packages and/or the nodes in the cluster. In the example of FIG. 3, administration role category 304 is further sub-divided into per-package administration role (PPAR) 304a, cluster-wide package administration role (CWPAR) 304b, and full administration role (FAR) 304c.

Even though the example only shows the subdividing of the administration role category, it is certainly possible to subdivide other role categories. Further, while the sub-dividing of the administration role category in accordance with the implementation of FIG. 3 into three sub-categories is highly advantageous, other ways of sub-dividing each of the role categories are also possible. Furthermore, one or all of the sub-categories may also have child-categories or even grand-child-categories, etc. Thus, the degree of subdividing is unlimited.

To clarify, package is an encapsulation of all attributes making up a service. A service, such as an airline reservation system, may involve a single application or multiple applications working in concert. As such, there may be multiple objects associated with the multiple applications and other resources involved in providing the service. By encapsulating these objects and resources into a package, the service can be managed as a whole by a user with sufficient privilege.

Per-package administration role (PPAR) 304a refers to the privilege that allows a user having such a privilege to perform administrative tasks with respect to a particular package in a cluster. Typically, a user may start and/or halt a package of interest, such as the airline reservation system if that user is allowed to perform administrative tasks with respect to the airline reservation system.

Cluster-wide package administration role (CWPAR) 304b refers to the privilege that allows a user having such a privilege to perform administrative tasks with respect to any package in a cluster. Whereas a user having PPAR 304a may be able to administer only selected packages, another user having CWPAR 304b may be able to administer any package in a given cluster.

Full administration role (FAR) 304c refers to the privilege that allows a user having such a privilege to perform administrative tasks with respect to the cluster or with respect to any node in the cluster or any package in a cluster. Thus a user having FAR 304c may be able to start a node, halt a node, start a cluster, halt a cluster, etc.

Configuration role category 306 refers to the privilege that allows a user having such a privilege to configure and/or make configuration changes to packages, nodes, and clusters. For example, configuration role category 306 allows a user to create a cluster, modify a cluster, delete a cluster, create a package, modify a package, delete a package, add a node, delete a node, etc. Whereas monitoring role category 302 only allows a user to view information, and administration role category 304 only allows a user the privilege, in addition to those privileges associated with monitoring role category 302, to start and halt packages, nodes and even the cluster, configuration role category 306 allows the user to make fundamental changes to the configuration of these entities.

In accordance with one aspect of the present invention, the identity of the user's name, the user's host, and the user's assigned role are all relevant in determining whether authorization is given. As will be shown later, the same user may be assigned different roles (i.e., different privileges) depending on which host the user employs to access the cluster. This feature enhances security since the system administrator may wish to limit a user's ability to perform certain actions based on the host identity (e.g., allowing the user to perform certain actions only when accessing via a particular host).

FIG. 4 shows, in accordance with one embodiment of the present invention, a conceptual representation of the authorization map, which is associated with a cluster and replicated on each cluster member node. Unlike the situation in the prior art, authorization now also involves determining whether the entity making the access has the proper role (i.e., having at least the privilege required for the access or a greater privilege than required). Thus, the authorization map in accordance with one embodiment of the invention includes role data in addition to the user's name and user's host. Authorization is no longer an all-or-nothing determination, i.e., whether the user is root or non-root.

Generally speaking, the authorization map is set up at the time the attributes for a particular cluster or a package is set up. The authorization map can be subsequently modified by the system administrator as the system changes or as users and/or nodes are added and/or removed.

Preferably, the authorization attributes are stored in the authorization map in memory as part of the daemon configuration data (versus on disk). Thus the authorization attributes are always available for fast access to service access requests and to grant/deny authorization without having to access file I/O (which is need in the prior art since the prior art file cmclnodelist implements file-based authorization maps stored on disks).

In FIG. 4, two administrator-defined data structures are shown: cluster_member_node and any_node. In this example, cluster_member_node includes all nodes in the cluster. When a node is added or deleted, the addition or deletion is automatically reflected in the membership of cluster_member_node and that user's privilege is correspondingly changed in the authorization map. Thus, the system administrator may make the addition or deletion in one place (i.e., with the data structure cluster_member_node) and have the changes automatically reflected in the authorization map (and its replica in various nodes of the cluster) and acted upon by the various access control policies if they reference that data structure.

Any_node includes any node in the cluster. An policy defined for the data structure any_node would affect any node that can be connected to the cluster. By defining these data structures, the administrator can conveniently define a policy for a group of nodes instead of having to define the policy for individual nodes. Of course a data structure (e.g., Group_One) may also be defined for a specific subset of the nodes to allow the administrator to manage their policies efficiently.

FIG. 4 illustrates the concept of hierarchical role-based access. FIG. 4 also shows that the origin of the system from which the request originates affects the privileges given to a given user. For example, a request to halt package A (pkgA) from Jim via Sys A matches both entry #4 and entry #6 in FIG. 4 (the entry numbers are present in FIG. 4 to facilitate discussion). Entry #4 shows that Jim is granted the per_package_admin privilege for package A. On the other hand, entry #6 grants Jim only the monitor privilege. Since the per_package_admin privilege on package A is inclusive of the monitor privilege as shown in FIG. 3, Jim in this case gets the per_package_admin privilege, allowing him to halt package A.

In another example, a request to halt package A (pkgA) from Jack via node1 of the cluster matches two possible entries: entry #1 and entry #7. Entry #1 gives Jack the cluster_wide package_admin privilege which is higher in privilege than the monitor privilege granted in accordance with entry # 7. In this case, Jack is granted the cluster_wide package_admin privilege and can therefore halt package A.

In another example, suppose Jack requests from Sys A to halt package A (pkgA). Entries #6 and #7 both provide a match. Note that since Sys A is not a member node (i.e., Sys A is a remote system), entry #1 does not provide a match. Both entries #6 and #7 grant Jack the monitor privilege. Jack is not granted the authority to halt any package per any other entries.

As can be seen in these examples, the privilege granted to Jack depends on the system/node through which Jack issues his request. When Jack's request is issued via node1, Jack is granted the cluster_side_package_admin privilege. When Jack's request is issued via Sys A, Jack is only granted the monitor privilege. The ability to control the level of privilege granted to a user depending on the system through which that user issues a request is a particularly useful feature in situations where certain systems are deemed to be in locations that are not secure and extra safeguards are needed with respect to requests coming through those systems.

In one embodiment, the authorization map itself is automatically replicated on all nodes of the cluster upon startup of the cluster or when there is a change in any one copy of the authorization map. Generally speaking, any data replication technique associated with the database art may be employed. Thus, the system administrator needs to make a change to the authorization map only once, and the authorization map can be replicated automatically among the different authorization daemons in the cluster. This automatic replication feature with respect to the authorization map is highly efficient for system administrators since the system administrators no longer needs to manually make changes to individual file-based authorization maps or to manually replicate the changes among the file-based authorization maps. Automatic replication of the authorization map also helps reduce human-related errors in updating the authorization maps.

One advantage of the invention is that it is possible for a user to be authorized to perform certain actions without having an account with the system. As long as the user is authorized in accordance with the authorization map (which may be set up by the system administrator), authorization may be granted and the user may undertake whatever task permissible under the role assigned to that user. This in turn increases the level of convenience for the users and reduces the system administration workload for system administrators.

Figure 5:
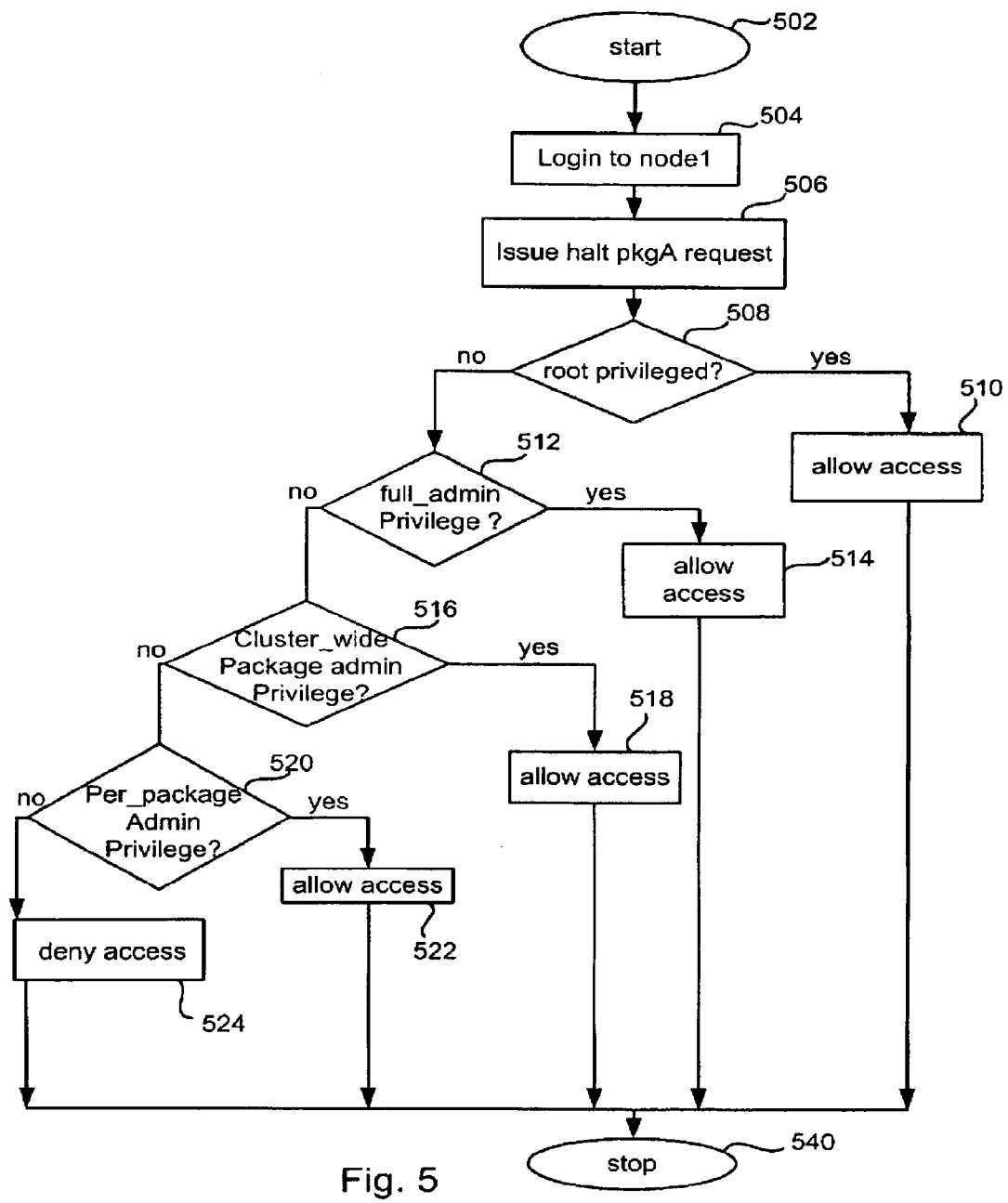
FIG. 5 shows, in accordance with an embodiment of the invention, the steps for deciding whether a hypothetical user's request should be granted.

FIG. 5 shows, in accordance with an embodiment of the invention, the steps for deciding whether a hypothetical user's request should be granted. In step 504, the user, who may be employing a remote system, logs on to the cluster via a hypothetical node 1. In step 506, the user issues a request to perform an administrative action, such as halt package A as shown in step 506. In step 508, the authorization daemon which receives the request ascertains whether the user has root privilege. In one embodiment, if the user has root privilege, there is no need to check the authorization map further since the user is, by default, entitled to the highest privilege. If the user has root privilege, the access is granted to perform the action (510).

On the other hand, if the user does not have root privilege, the authorization daemon proceeds to check whether the user has sufficient privilege using the authorization tree map. Thus, the user is first checked (in step 512) whether he possesses full administration privilege. Since the full administration privilege is a higher privilege level than that required to perform the halt package A action, access is granted if the user is found to have such full administration privilege (step 514).

On the other hand, if the user does not have the full administration privilege, the authorization daemon proceeds to check whether the user has sufficient privilege using the authorization tree map. Thus, the user is next checked (in step 516) whether he possesses the next lower level of privilege, i.e., the cluster-wide package administration privilege. Access is granted if the user is found to have such cluster-wide package administration privilege (step 518).

On the other hand, if the user does not have the cluster-wide package administration privilege, the authorization daemon proceeds to check whether the user has sufficient privilege using the authorization tree map. Thus, the user is next checked (in step 520) whether he possesses the next lower level of privilege, i.e., the per-package administration privilege. Access is granted in step 522 if the user is found to have such per-package administration privilege with respect to package A.

On the other hand, if the user does not have the per-package administration privilege, there is no need to check further and the user is denied in step 524.

As can be appreciated from the foregoing, embodiments of the invention enable secure remote access to the cluster from a remote user through a remote system. The multiple levels of privileges, which can be hierarchical and inclusive of each other and the ability to control access based on the identity of the user and the host enable the system administrator to implement sophisticated access control policies that balance user convenience and the risks of accidental and/or malicious actions. By storing the authorization map in memory instead of on disk, the invention vastly improves the response time when a decision regarding access authorization is required. Furthermore, since the authorization map is automatically replicated and synchronized among the nodes, the system administrator is relieved of the need to manually replicate the authorization map. Without such human intervention, the potential for human-related errors is also reduced.

While this invention has been described in terms of several preferred embodiments, there are alterations, permutations, and equivalents which fall within the scope of this invention. For example, although the specific example is discussed in terms of techniques for authorizing an action in a cluster, the invention also covers electronic systems, devices, and arrangements (such as the cluster) in which the inventive technique is practiced. The invention also covers articles of manufacture (such as disks and/or memory devices) having thereon computer readable codes for implementing the techniques discussed therein. It should also be noted that there are many alternative ways of implementing the apparatuses of the present invention. It is therefore intended that the following appended claims be interpreted as including all such alterations, permutations, and equivalents as fall within the true spirit and scope of the present invention.

What is claimed is:

1. In a computer cluster having a plurality of nodes configured for executing a plurality of software packages, a computer-implemented method of authorizing a user request from a user to perform an action with respect to one of at least one of said plurality of nodes and at least one of said plurality of packages, said user request being received from a host coupled to communicate with said cluster, the computer-implemented method comprising:
   consulting an authorization map to ascertain a role associated with said user, said authorization map being kept in a memory space in one of said plurality of nodes; and
   if said role associated with said user includes a granted privilege, which is not a root user privilege and is not a normal user privilege, that is higher than a privilege required to perform said user request, authorizing said user to perform said action.

2. The method of claim 1 wherein said authorization map includes at least three different roles, each of said at least three different roles having a different level of privilege.

3. The method of claim 2 wherein said at least three different roles include at least one of a cluster-wide package administration role, a per-package administration role, and a full-administration role.

4. The method of claim 3 wherein said cluster-wide package administration role is configured to permit said user to perform an administrative task with respect to any package in said cluster.

5. The method of claim 3 wherein said per-package administration role is configured to permit said user to perform an administrative task with respect to a specific package in said cluster.

6. The method of claim 3 wherein said full administration role is configured to permit said user to perform any administrative task with respect to one of any node and any package in said cluster.

7. The method of claim 2 wherein said at least three different roles include at least one of a monitor role, an administration role, and a configuration role.

8. The method of claim 7 wherein said monitor role is configured to permit said user to monitor one of a node in said plurality of nodes and a package in said plurality of packages without being able to perform an administrative task with respect to any node in said plurality of node or with respect to any package in said plurality of packages.

9. The method of claim 7 wherein said administration role is configured to permit said user to perform an administration task with respect to one of a node in said plurality of nodes and a package in said plurality of packages without being able to perform a configuration task with respect to any node in said plurality of node or with respect to any package in said plurality of packages.

10. The method of claim 7 wherein said configuration role is configured to permit said user to perform a configuration task with respect to one of a node in said plurality of nodes and a package in said plurality of packages.

11. The method of claim 2 wherein said at least three different roles include a monitor role, an administration role, and a configure role.

12. The method of claim 11 wherein said configuration role, said administration role, and said monitor role are hierarchical, with said configuration role including all privileges associated with said administration role and with said administration role including all privileges associated with said monitor role.

13. The method of claim 1 wherein a role associated with a given user in said authorization map is dependent upon an identity of said host through which said user request is received.

14. The method of claim 1 wherein said user is associated with at least two different roles in said authorization map, a first role in said two different roles being associated with a first host identity, said second role in said at least two different roles being associated with a second host identity.

15. The method of claim 1 wherein said authorization map is automatically replicated among said plurality of nodes when a change is made to said authorization map.

16. The method of claim 1 wherein said authorization map is set up when said cluster is originally set up.

17. The method of claim 1 wherein at least one role in said authorization map is associated with privileges that are between root user privileges and a normal user privileges.

18. An article of manufacture comprising a program storage medium having computer readable code embodied therein, said computer readable code being configured to authorize a user request from a user of a computer cluster having a plurality of nodes configured for executing a plurality of software packages, said user request involves a request to perform an action with respect to one of at least one of said plurality of nodes and at least one of said plurality of packages, the computer readable code comprising:
   computer readable code which consults an authorization map to ascertain a role associated with said user, said authorization map being kept in a memory space in one of said plurality of nodes; and
   computer readable code which authorizes said user to perform said action if said role associated with said user includes a granted privilege, which is not a root user privilege and is not a normal user privilege, that is higher than a privilege required to perform said user request.

19. The article of manufacture of claim 18 wherein said authorization map includes at least three different roles, each of said at least three different roles having a different level of privilege.

20. The article of manufacture of claim 19 wherein said at least three different roles include at least one of a monitor role, an administration role, and a configuration role.

21. The article of manufacture of claim 20 wherein said monitor role is configured to permit said user to monitor one of a node in said plurality of nodes and a package in said plurality of packages without being able to perform an administrative task with respect to any node in said plurality of node or with respect to any package in said plurality of packages.

22. The article of manufacture of claim 20 wherein said administration role is configured to permit said user to perform an administration task with respect to one of a node in said plurality of nodes and a package in said plurality of packages without being able to perform a configuration task with respect to any node in said plurality of node or with respect to any package in said plurality of packages.

23. The article of manufacture of claim 20 wherein said configuration role is configured to permit said user to perform a configuration task with respect to one of a node in said plurality of nodes and a package in said plurality of packages.

24. The article of manufacture of claim 18 wherein a role associated with a given user in said authorization map is dependent upon an identity of said host through which said user request is received.

25. The article of manufacture of claim 18 wherein said user is associated with at least two different roles in said authorization map, a first role in said two different roles being associated with a first host identity, said second role in said at least two different roles being associated with a second host identity.

26. The article of manufacture of claim 18 further including computer readable code for automatically replicating said authorization map when a change is made to said authorization map.

27. A computer cluster having a plurality of nodes configured for executing a plurality of software packages, said computer cluster having an arrangement for authorizing a user request from a user to perform an action with respect to one of at least one of said plurality of nodes and at least one of said plurality of packages, said user request being received from a host coupled to communicate with said cluster, the computer cluster comprising:

a computer having an arrangement which includes an authorization map having data pertaining to roles associated with users, at least one role of said roles in said authorization map is associated with privileges different from privileges associated with a Unix root user, said privileges associated with said at least one role being also different from privileges associated with a Unix normal user, said authorization map being kept in a memory space in one of said plurality of nodes.

28. The computer cluster of claim 27 wherein at least a set of roles of said roles being hierarchical in nature, a higher privilege role in said set of roles including privileges associated with a lower privilege role in said set of roles.

29. The computer cluster of claim 27 wherein said authorization map includes at least three different roles, each of said at least three different roles having a different level of privilege.

30. The computer cluster of claim 29 wherein said at least three different roles include at least one of a cluster-wide package administration role, a per-package administration role, and a full-administration role.

31. The computer cluster of claim 30 wherein said cluster-wide package administration role is configured to permit said user to perform an administrative task with respect to any package in said cluster.

32. The computer cluster of claim 30 wherein said per-package administration role is configured to permit said user to perform an administrative task with respect to a specific package in said cluster.

33. The computer cluster of claim 30 wherein said full administration role is configured to permit said user to perform any administrative task with respect to one of any node and any package in said cluster.

34. The computer cluster of claim 29 wherein said at least three different roles include at least one of a monitor role, an administration role, and a configuration role.

35. The computer cluster of claim 34 wherein said monitor role is configured to permit said user to monitor one of a node in said plurality of nodes and a package in said plurality of packages without being able to perform an administrative task with respect to any node in said plurality of node or with respect to any package in said plurality of packages.

36. The computer cluster of claim 34 wherein said administration role is configured to permit said user to perform an administration task with respect to one of a node in said plurality of nodes and a package in said plurality of packages without being able to perform a configuration task with respect to any node in said plurality of node or with respect to any package in said plurality of packages.

37. The computer cluster of claim 34 wherein said configuration role is configured to permit said user to perform a configuration task with respect to one of a node in said plurality of nodes and a package in said plurality of packages.

38. The computer cluster of claim 29 wherein said at least three different roles include a monitor role, an administration role, and a configure role.

39. The computer cluster of claim 38 wherein said configuration role, said administration role, and said monitor role are hierarchical, with said configuration role including all privileges associated with said administration role and with said administration role including all privileges associated with said monitor role.

40. The computer cluster of claim 27 wherein a role associated with a given user in said authorization map is dependent upon an identity of said host through which said user request is received.

41. The computer cluster of claim 27 wherein said user is associated with at least two different roles in said authorization map, a first role in said two different roles being associated with a first host identity, said second role in said at least two different roles being associated with a second host identity.

42. The computer cluster of claim 27 wherein said authorization map is automatically replicated among said plurality of nodes when a change is made to said authorization map.

43. The computer cluster of claim 27 wherein said authorization map is set up when said cluster is originally set up.

* * * * *